(12) United States Patent
Alexeev et al.

(10) Patent No.: US 10,592,107 B2
(45) Date of Patent: Mar. 17, 2020

(54) VIRTUAL MACHINE STORAGE MANAGEMENT QUEUE

(71) Applicant: EMC IP Holding Company LLC, Hopkinton, MA (US)

(72) Inventors: Sergey Alexandrovich Alexeev, Saint Petersburg (RU); Alexey Vladimirovich Shusharin, Saint Petersburg (RU); Ilya Konstantinovich Morev, Saint Petersburg (RU); Sergey Alexandrovich Zaporozhtsev, Sydney (AU); Yakov Stanislavovich Belikov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 126 days.

(21) Appl. No.: 15/318,936

(22) PCT Filed: Mar. 30, 2016

(86) PCT No.: PCT/RU2016/000181
§ 371 (c)(1),
(2) Date: Dec. 14, 2016

(87) PCT Pub. No.: WO2017/171575
PCT Pub. Date: Oct. 5, 2017

(65) Prior Publication Data
US 2018/0210650 A1    Jul. 26, 2018

(51) Int. Cl.
*G06F 3/06* (2006.01)
*G06F 16/00* (2019.01)
(Continued)

(52) U.S. Cl.
CPC ............ *G06F 3/0604* (2013.01); *G06F 3/061* (2013.01); *G06F 3/067* (2013.01); *G06F 3/0659* (2013.01);
(Continued)

(58) Field of Classification Search
CPC .... G06F 3/0604; G06F 9/45558; G06F 3/061; G06F 3/0659; G06F 3/0665; G06F 3/067; H04L 67/1008; H04L 67/1097
(Continued)

(56) References Cited

U.S. PATENT DOCUMENTS 6,112,265 A * 8/2000 Harriman ................ G06F 3/061
710/39
6,157,963 A * 12/2000 Courtright, II ......... G06F 3/061
710/40
(Continued)

FOREIGN PATENT DOCUMENTS

| WO | 2014102564 A1 | 7/2014 |
| WO | 2014147438 A1 | 9/2014 |
| WO | 2015099554 A1 | 7/2015 |

OTHER PUBLICATIONS

B. Sotomayor, R. S. Montero, I. M. Llorente and I. Foster, "Virtual Infrastructure Management in Private and Hybrid Clouds," in IEEE Internet Computing, vol. 13, No. 5, pp. 14-22, Sep.-Oct. 2009. (Year: 2009).*
(Continued)

*Primary Examiner* — Reginald G Bragdon
*Assistant Examiner* — Aaron D Ho
(74) *Attorney, Agent, or Firm* — BainwoodHuang (57) ABSTRACT

Embodiments are directed to a method performed by a computing device. The method includes (a) receiving, by the computing device, a stream of storage management commands directed at logical disks hosted by a DSS, the logical
(Continued)

disks being accessible to VMs running on a remote host, each storage management command having a command type of a plurality of command types, each command type of the plurality of command types having a respective timeout period, (b) placing the storage management commands of the stream into a VM storage management queue stored on the computing device, and (c) selectively dequeueing storage management commands stored in the VM storage management queue to be performed by the DSS, wherein selectively dequeueing includes applying a set of dequeueing criteria, the set of dequeueing criteria including a criterion that selects storage management commands from the VM storage management queue according to their respective command types.

19 Claims, 4 Drawing Sheets

(51) Int. Cl.
    *G06F 9/455*     (2018.01)
    *H04L 29/08*     (2006.01)
(52) U.S. Cl.
    CPC .......... *G06F 9/45558* (2013.01); *G06F 16/00* (2019.01); *H04L 67/1097* (2013.01); *G06F 3/0665* (2013.01)
(58) Field of Classification Search
    USPC .......................................................... 711/114
    See application file for complete search history.

(56) References Cited

U.S. PATENT DOCUMENTS

| | | | | |
|---|---|---|---|---|
| 6,182,177 | B1* | 1/2001 | Harriman | G06F 13/18 710/112 |
| 6,453,356 | B1* | 9/2002 | Sheard | G06F 8/34 709/231 |
| 7,206,866 | B2* | 4/2007 | Hendel | G06F 3/0613 710/33 |
| 7,594,024 | B2 | 9/2009 | Shah et al. | |
| 7,664,823 | B1* | 2/2010 | Wakerly | G06F 15/163 709/211 |
| 7,680,793 | B2* | 3/2010 | Wong | G06F 16/2365 707/999.008 |
| 8,505,016 | B2* | 8/2013 | Chung | G06F 9/4881 718/103 |
| 8,756,369 | B2* | 6/2014 | McKean | G06F 3/0611 710/241 |
| 9,058,208 | B2* | 6/2015 | Chang | G06F 9/4881 |
| 9,058,273 | B1* | 6/2015 | Hollaway, Jr. | G06F 12/0831 |
| 9,519,943 | B2* | 12/2016 | Rogers | G06T 1/20 |
| 2003/0088591 | A1 | 5/2003 | Fish | |
| 2003/0225988 | A1* | 12/2003 | Ralphs | G06F 3/0601 711/167 |
| 2005/0066138 | A1* | 3/2005 | Horn | G06F 9/4881 711/158 |
| 2009/0006741 | A1 | 1/2009 | Lubbers et al. | |
| 2010/0011149 | A1* | 1/2010 | Molaro | G06F 3/0613 711/103 |
| 2010/0082856 | A1* | 4/2010 | Kimoto | H04L 47/10 710/45 |
| 2013/0262761 | A1* | 10/2013 | Oh | G06F 3/0659 711/114 |
| 2014/0195699 | A1* | 7/2014 | Sokol, Jr. | G06F 13/18 710/40 |
| 2015/0339168 | A1* | 11/2015 | Mason | G06F 9/5027 718/104 |
| 2015/0347327 | A1* | 12/2015 | Blaine | G06F 13/18 711/103 |
| 2016/0103738 | A1* | 4/2016 | Forgette | G06F 16/128 707/639 |
| 2017/0221173 | A1* | 8/2017 | Acharya | G06T 1/20 |

OTHER PUBLICATIONS

J. Hildebrandt, F. Golatowski and D. Timmermann, "Scheduling coprocessor for enhanced least-laxity-first scheduling in hard real-time systems," Real-Time Systems, 1999. Proceedings of the 11th Euromicro Conference on, York, 1999, pp. 208-215. (Year: 1999).*
J. Crowcroft, "Scheduling and Queue Management", 2010, Hosted by Computer Laboratory, University of Cambridge, <https://www.cl.cam.ac.uk/teaching/1011/PrincComm/slides/scheduling-11.pdf> (Year: 2010).*
Christopher R. Lumb, Arif Merchant, and Guillermo A. Alvarez. 2003. Façade: virtual storage devices with performance guarantees. In Proceedings of the 2nd USENIX conference on File and storage technologies (FAST'03). USENIX Association, Berkeley, CA, USA, 10-10. (Year: 2003).*
Anna Povzner, Darren Sawyer, and Scott Brandt. 2010. Horizon: efficient deadline-driven disk I/O management for distributed storage systems. In Proceedings of the 19th ACM International Symposium on High Performance Distributed Computing (HPDC '10). ACM, New York, NY, USA, 1-12. (Year: 2010).*
David B. Stewart, Pradeep K. Khosla, "Real-Time Scheduling of Sensor-Based Control Systems", in Real-Time Programming, ed. by W. Halang and K. Ramamritham, (Tarrytown, NY: Pergamon Press Inc.), 1992. (Year: 1992).*
Sung-Heun Oh and Seung-Min Yang, "A Modified Least-Laxity-First scheduling algorithm for real-time tasks," Proceedings Fifth International Conference on Real-Time Computing Systems and Applications (Cat. No. 98EX236), Hiroshima, 1998, pp. 31-36. (Year: 1998).*
Y. Hu, X. Long, J. Zhang, J. He, and L. Xia. 2010. I/O scheduling model of virtual machine based on multi-core dynamic partitioning. In Proc. of the 19th ACM International Symposium on High Performance Distributed Computing (HPDC '10). ACM, New York, NY, USA, 142-154. (Year: 2010).*
Edward K. Lee and Chandramohan A. Thekkath. 1996. "Petal: distributed virtual disks". In Proceedings of the seventh international conference on Architectural support for programming languages and operating systems (ASPLOS VII). ACM, New York, NY, USA, 84-92. DOI=http://dx.doi.org/10.1145/237090.237157 (Y.*
Alexey Vladimirovich Shusharin, et al.; "Techniques for Providing Access to a Virtualized Block Storage Device Over a File-Based Network Storage Protocol"; U.S. Appl. No. 14/319,739, filed Jun. 30, 2014.
Dmitry Nikolayevich Tylik, et al.; "Static Service Levels and Application Specific Usage Tags for Storage Policy Based Management of Storage Resources"; U.S. Appl. No. 14/673,027, filed Mar. 30, 2015.
Aleksei Alexandrovich Polkovnikov, et al.; "Dynamic Storage Tiering Based on Predicted Workloads"; U.S. Appl. No. 15/129,522, filed Sep. 27, 2016.

* cited by examiner

VIRTUAL MACHINE STORAGE MANAGEMENT QUEUE

BACKGROUND

Virtual machines (VMs) are used to allow several logical computers to run on a single computing device. VMs conveniently may also be created on-the-fly as needed. Typically, a VM makes use of several different disk volumes, including, for example, a configuration volume, a data volume, a swap volume, etc. In some systems (e.g., VMware), each VM has at least four volumes, and each volume may have up to 32 snapshots (presenting a view of the data on that volume at a particular moment in time). Thus, each VM may be associated with 128 or more volumes. If a system runs 1,000 VMs, for example, there may be on the order of 128,000 volumes, which is more than a typical data storage system is capable of presenting at once, even if the system is internally capable of managing that many logical drives.

A virtual logical volume (e.g., a VMWare VVol) is a logical volume that is managed by a data storage system but presented to an external host via a protocol endpoint (PE). A PE presents many internal logical volumes to an external host. An external host is able to monitor and manage virtual logical volumes on a data storage system (DSS) by making management calls to a virtual logical volume manager. For example, in the case of VMWare VVols, the host may make calls using the vSphere Storage APIs for Storage Awareness (VASA) to a VASA provider application operating either on or off of the DSS.

SUMMARY

Unfortunately, there are complications in operating a VASA provider to provide responses to VASA commands in an efficient manner. For example, if the VASA provider is inundated with commands, it may attempt to process more commands at once than can be efficiently handled by the data storage system, causing an operations scheduler on the DSS to perform multitasking management in order to effectively switch between and prioritize threads. However, because the operations scheduler is unaware of the VASA protocols, it may perform this task sub-optimally. For example, certain VASA commands may have a long timeout period (e.g., 60 seconds), while other may have relatively short timeout period (e.g., 5 seconds). If the VASA provider is inundated with many long timeout period VASA commands followed by some short timeout period VASA commands, the operations scheduler may schedule all the long timeout period VASA commands to complete before proceeding to the short timeout period VASA commands. This may cause the short timeout period requests to fail due to timeout even though they may be regarded as higher priority than the longer timeout period requests that were scheduled earlier.

Thus, it would be desirable to implement a VASA-aware scheduling layer able to present VASA commands to the data storage system in a manner that takes the type of VASA command and other protocol-specific requirements into account in the scheduling process. This may be achieved by implementing a Command-type Aware VVol Management Command Scheduler in conjunction with a VVol Management Command Queue on the VASA provider.

In one embodiment, a computer-implemented method is performed by a computing device. The method includes (a) receiving, by the computing device, a stream of storage management commands directed at logical disks hosted by a DSS, the logical disks being accessible to VMs running on a remote host, each storage management command having a command type of a plurality of command types, each command type of the plurality of command types having a respective timeout period, (b) placing the storage management commands of the stream into a VM storage management queue stored on the computing device, and (c) selectively dequeueing storage management commands stored in the VM storage management queue to be performed by the DSS, wherein selectively dequeueing includes applying a set of dequeueing criteria, the set of dequeueing criteria including a criterion that selects storage management commands from the VM storage management queue according to their respective command types. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to implementing a VASA-aware scheduling layer able to present VASA commands to the data storage system in a manner that takes the type of VASA command and other protocol-specific requirements into account in the scheduling process. This may be achieved by implementing a Command-type Aware VVol Management Command Scheduler in conjunction with a VVol Management Command Queue on the VASA provider.

Figure 1:
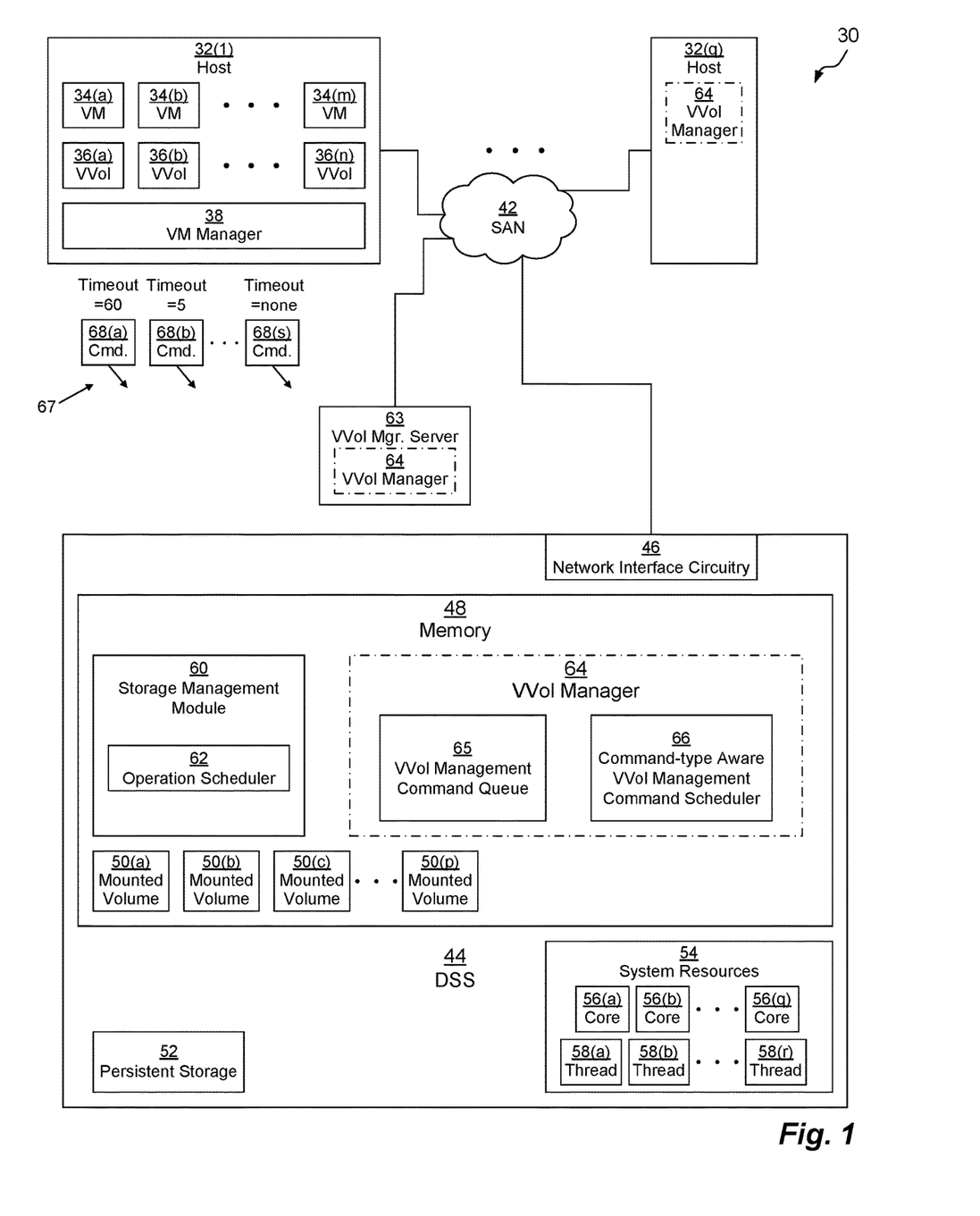
FIG. 1 is a block diagram depicting an example system and apparatus for use in connection with various embodiments.

FIG. 1 depicts a system 30. System 30 includes a set of hosts 32 (depicted as hosts 32(1), . . . , 32(*q*)) that communicate with a data storage system (DSS) 44 over a network, such as storage area network (SAN) 42, although that is by way of example only.

A host 32 may be any kind of computing device configured to operate on a network, such as, for example, personal computers, workstations, server computers, enterprise servers, laptop computers, tablet computers, smart phones, mobile computers, etc. or combinations thereof. Typically, a host 32 is a server computer or an enterprise server. Host 32(1) represents an example typical host 32. A typical host 32(1) runs a virtual machine (VM) management application 38, which manages a plurality of VMs 34 (depicted as VMs 34(*a*), 34(*b*), . . . , 34(*m*)) executing on one or more processors (not depicted) of the host 32(1). VM management application 38 may include a hypervisor, as is well-known in the art. Each VM 34 may be associated with one or more virtual storage volumes such as VVols 36 (depicted as VVols 36(*a*), 36(*b*), . . . , 36(*n*)). These VVols 36 are not actually present on host 32(1), being logical abstractions of storage volumes presented by DSS 44, made to appear to the VMs 34 like actual disks by the VM management application 38.

DSS 44 is a computing device, having network interface circuitry 46, memory 48, persistent storage 52, and other system resources 54. DSS 44 may be any kind of computing device, such as, for example, a personal computer, workstation, server computer, enterprise server, laptop computer, tablet computer, smart phone, mobile computer, etc. or combinations thereof. Typically, a DSS 44 is a cabinet-mounted device having two or more storage processors (not depicted) configured to access the persistent storage 52. In a typical arrangement, a storage processor is configured as a board or enclosure mounted within a rack connected to persistent storage 52 also mounted within the rack. These components, in combination, may make up DSS 44.

Network interface circuitry 46 may include one or more Ethernet cards, cellular modems, Fibre Channel (FC) adapters, Wireless Fidelity (Wi-Fi) wireless networking adapters, and other devices for connecting to a network, such as a SAN 42, local area network (LAN), wide area network (WAN), cellular data network, etc. Network interface circuitry 46 is able to communicate with hosts 32. In operation, VMs 34 running on host 32(1) send data storage commands to DSS 44 in order to read from and write to persistent storage 52.

Persistent storage 52 may include one or more of any kind of storage device (not depicted) able to persistently store data, such as, for example, a magnetic hard disk drive, a solid state storage device (SSD), etc. Persistent storage 52 may be arranged as a plurality of RAID groups, each made up of one or more storage devices, which may logically combine to create a logical disk having larger size or redundancy features or both, depending on the RAID level, as is well-known in the art.

System resources 54 includes other resources of the DSS 44 not otherwise depicted, including processing circuitry, I/O circuitry configured to connect to a storage interconnect bus (e.g., via a backplane) to enable communication with disks of persistent storage 52. The storage interconnect bus may include one or more of a Fiber Channel, SCSI, Serial Attached SCSI, ATA, Serial ATA, or other similar storage buses for communicating with storage. The processing circuitry of system resources 54 includes a set of processing cores 56 (depicted as cores 56(*a*), 56(*b*), . . . , 56(*q*)) capable of executing a set of execution threads 58 (depicted as threads 58(*a*), 58(*b*), . . . , 58(*r*)), which may execute in parallel.

Memory 48 may be any kind of digital system memory, such as, for example, random access memory (RAM). Memory 48 stores one or more operating systems in operation (not depicted, e.g., Linux, UNIX, Windows, MacOS, or a similar operating system), various applications executing on cores 56 (e.g., storage management module 60 and VVol manager 64) as well as data used by those applications. Memory 48 may also store in-memory representations of mounted volumes 50 (depicted as mounted volumes 50(*a*), 50(*b*), 50(*c*), . . . , 50(*p*)) as well as in-memory representations of threads 58 (not depicted within memory 48).

Mounted volumes 50 may either be actual partitions on persistent storage or they may be made up of a plurality of slices drawn from persistent storage, either thinly- or thickly-allocated, as is well-known in the art.

Storage management module 60 is configured to allow storage management operations to be performed on the mounted volumes 50. Storage management module 60 may include an operations scheduler 62, which also runs on cores 56 and is configured to assign storage management operations to particular threads 58 executing on particular cores 56. However, storage management module 60 is not aware of the VASA protocol (or another similar VM storage management protocol).

VVol manager 64 is shown dashed in memory 48 because it only runs on DSS 44 in some embodiments. In other embodiments, VVol manager 64 instead runs on one of the hosts 32 (depicted on host 32(*q*)) or on a VVol management server 63. VVol manager 64 includes a Command-type Aware VVol Management Command Scheduler 66, which also runs on cores 56. VVol manager 64 also includes a VVol Management Command Queue 65. Further detail with respect to VVol manager 64, VVol Management Command Queue 65, and Command-type Aware VVol Management Command Scheduler 66 is provided below in connection with FIG. 2.

In some embodiments, memory 48 may also include a persistent storage portion (not depicted). Persistent storage portion of memory 48 may be made up of one or more persistent storage devices, such as, for example, hard disk drives, solid-state storage devices, flash drives, etc. Persistent storage of memory 48 is configured to store programs and data even while the DSS 44 is powered off. The OS (e.g., Linux, UNIX, Windows, or a similar operating system) and the applications (e.g., modules 60, 62, 64, 66) are typically stored in persistent storage (either persistent storage of memory 48 or persistent storage 52) so that they may be loaded into a system portion of memory 48 from persistent storage upon a system restart. These applications, when stored in non-transient form either in the volatile portion of memory 48 or in persistent storage, form a computer program product. The cores 56 running one or more of these applications thus forms a specialized circuit constructed and arranged to carry out the various processes described herein.

A stream 67 of storage management commands 68 (depicted as commands 68(*a*), 68(*b*), . . . , 68(*s*)) are shown traversing SAN 42 from host 32 to DSS 44. Each storage management command 68 has a timeout value associated therewith. For example, command 68(*a*) may be a VVol Bind or Unbind operation, shown having a timeout period of 60 seconds, while command 68(*b*) may be a VVol Snapshot Commit operation, shown having a timeout period of 5 seconds, and command 68(*s*) may be a VVol Create or Delete operation, shown having no timeout period.

Figure 2:
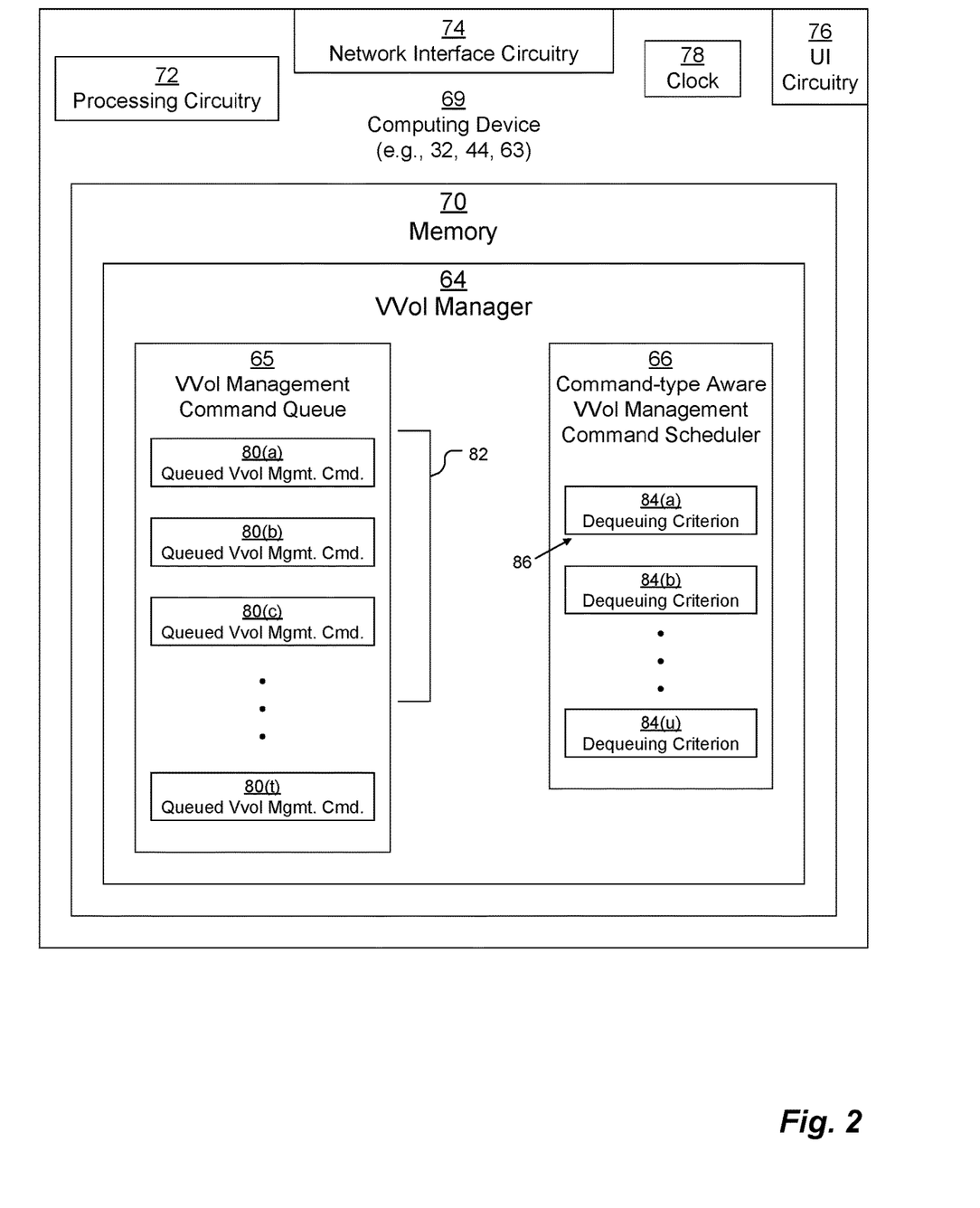
FIG. 2 is a block diagram depicting an example apparatus for use in connection with various embodiments.

FIG. 2 depicts a computing device 69 configured to run VVol manager 64. In some embodiments, computing device 69 is the DSS 44, in other embodiments, computing device 69 is a host 32, and in yet other embodiments, computing device 69 is a VVol management server 63.

Computing device 69 includes memory 70, processing circuitry 72, user interface (UI) circuitry 76, and a clock 78. Computing device 69 may also include other features typically found in a computing device (omitted for clarity).

Processing circuitry 72 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 74 may include one or more Ethernet cards, cellular modems, Fibre Channel (FC) adapters, Wireless Fidelity (Wi-Fi) wireless networking adapters, and other devices for connecting to a network, such as a SAN 42, local area network (LAN), wide area network (WAN), cellular data network, etc. Network interface circuitry 74 is able to communicate with hosts 32. In operation, VMs 34 running on a host 32 send storage management commands 68 to computing device 69 to be queued into and subsequently dequeued from VVol Management Command Queue 65 by Command-type Aware VVol Management Command Scheduler 66. Upon dequeueing, Command-type Aware VVol Management Command Scheduler 66 forwards the storage management commands 68 to the operation scheduler 62 on the DSS 44 for performance.

UI circuitry 76 contains circuitry for interfacing with one or more UI devices (not depicted) that allow one or more human agents (not depicted) to input and receive data to and from the computing device 69. For example, UI circuitry 76 may include a serial bus adapter, a graphics adapter, etc., while UI devices may include one or more of a display device (e.g., a CRT, LCD, plasma, or LED monitor) and an input device (e.g., a mouse, trackpad, tracking stick, keyboard, keypad, microphone, biometric sensor, etc.).

Clock 78 is configured to provide the time to the processing circuitry 72.

Memory 70 may be any kind of digital system memory, such as, for example, random access memory (RAM). Memory 70 stores one or more operating systems in operation (not depicted, e.g., Linux, UNIX, Windows, MacOS, or a similar operating system), various applications executing on processing circuitry 72 as well as data used by those applications.

As depicted, memory 70 stores VVol manager 64 during execution. VVol manager 64 includes Command-type Aware VVol Management Command Scheduler 66 and VVol Management Command Queue 65.

VVol Management Command Queue 65 stores queued VVol management commands 80 (depicted as queued VVol management commands 80(a), 80(b), 80(c), . . . , 80(t)), placed there by Command-type Aware VVol Management Command Scheduler 66 upon receiving respective storage commands 68 from hosts 32. In some embodiments, there is a threshold minimum number 82 of queued VVol management commands 80 (e.g., a minimum of eight queued VVol management commands 80) that must be present before Command-type Aware VVol Management Command Scheduler 66 begins dequeueing the queued VVol management commands 80 from the VVol Management Command Queue 65.

Command-type Aware VVol Management Command Scheduler 66 includes a set of dequeueing criteria 84 (depicted as dequeueing criteria 84(a), 84(b), . . . , 84(u)), which it applies to decide in what order to dequeue the queued VVol management commands 80 from the VVol Management Command Queue 65. At least one of the dequeueing criteria 84 (e.g., 84(a) as depicted) is a criterion that selects storage management commands from the VVol Management Command Queue 65 according to their respective command types 86.

In some embodiments, one or more of the following dequeueing criteria 84 may be defined:
  Limit the number of storage management commands 68 running simultaneously taking into account limitations of the system resources 54 of the DSS 44 such as number of cores 56, the number of threads 58 dedicated for management operations handing, etc.
  Accumulate incoming storage management commands 68 in the queue 65 for some period of time (e.g., 1 second) to be able to make prioritization decision effectively.
  Use a static operations priority scale, so, for example Bind operations will always go before Create operations. This is the simplest approach that can be quite effective in some cases, but, if used in isolation, it may have a starvation problem—higher priority requests may cause other requests to hang forever.
  Reserve threads 58 per type of storage management command 68 (or group of types of storage management commands 68), which means that, for example, only N Bind/Unbind and M Create/Delete storage management commands 68 can be executed simultaneously. N and M can be configured by the storage administrator or calculated/pre-defined by the system.
  Take into account the time storage management commands 68 have been waiting to be processed—how long a queued VVol management command 80 stays in the queue 65—compare it with the operation's response time requirement (e.g., based on the timeout period defined for that storage management command's 68 type) and/or with the waiting times of other storage management commands 68. So queued VVol management commands 80 which have stayed in the queue 65 for too long and whose timeout is about to expire are processed before it is too late.
  If the number of incoming queued VVol management commands 80 accumulated in the queue 65 reaches a maximum queue size limit—reject incoming storage management commands 68 with a VASA PROVIDER BUSY error code and thus inform the hosts 32 that the corresponding storage management command 68 should be retried a bit later since the DSS 44 is overloaded with incoming storage management commands 68.
  If number of incoming VVol management commands 80 accumulated in the queue 65 is high, and too many are reaching their timeout values to be timely processed, deliberately drop some of the VVol management commands 80 with VASA PROVIDER BUSY forcing the host 32 to retry the storage management commands 68 a bit later. The Command-type Aware VVol Management Command Scheduler 66 may drop VVol management commands 80 with types having a lowest relative priority in a hierarchy.
  In case of multiple clients (each client operating a separate VM manager 38), define priorities of storage management command 68 handling per client and enforce priorities while taking storage management commands 68 for processing from the queue 65.
  Allow a user (e.g., an administrator of the VVol manager 64) to configure parameters of the Command-type Aware VVol Management Command Scheduler 66.

In some embodiments, memory 70 may also include a persistent storage portion (not depicted). Persistent storage portion of memory 70 may be made up of one or more persistent storage devices, such as, for example, hard disk drives, solid-state storage devices, flash drives, etc. Persistent storage of memory 70 is configured to store programs and data even while the computing device 69 is powered off. The OS (e.g., Linux, UNIX, Windows, or a similar operating system) and the applications (e.g., VVol manager 64, Command-type Aware VVol Management Command Scheduler 66, etc.) are typically stored in persistent so that they may be loaded into memory 70 from persistent storage upon a system restart. These applications, when stored in nontransient form either in the volatile portion of memory 70 or in persistent storage, form a computer program product. The processing circuitry 72 running one or more of these applications thus forms a specialized circuit constructed and arranged to carry out the various processes described herein.

Figure 3:
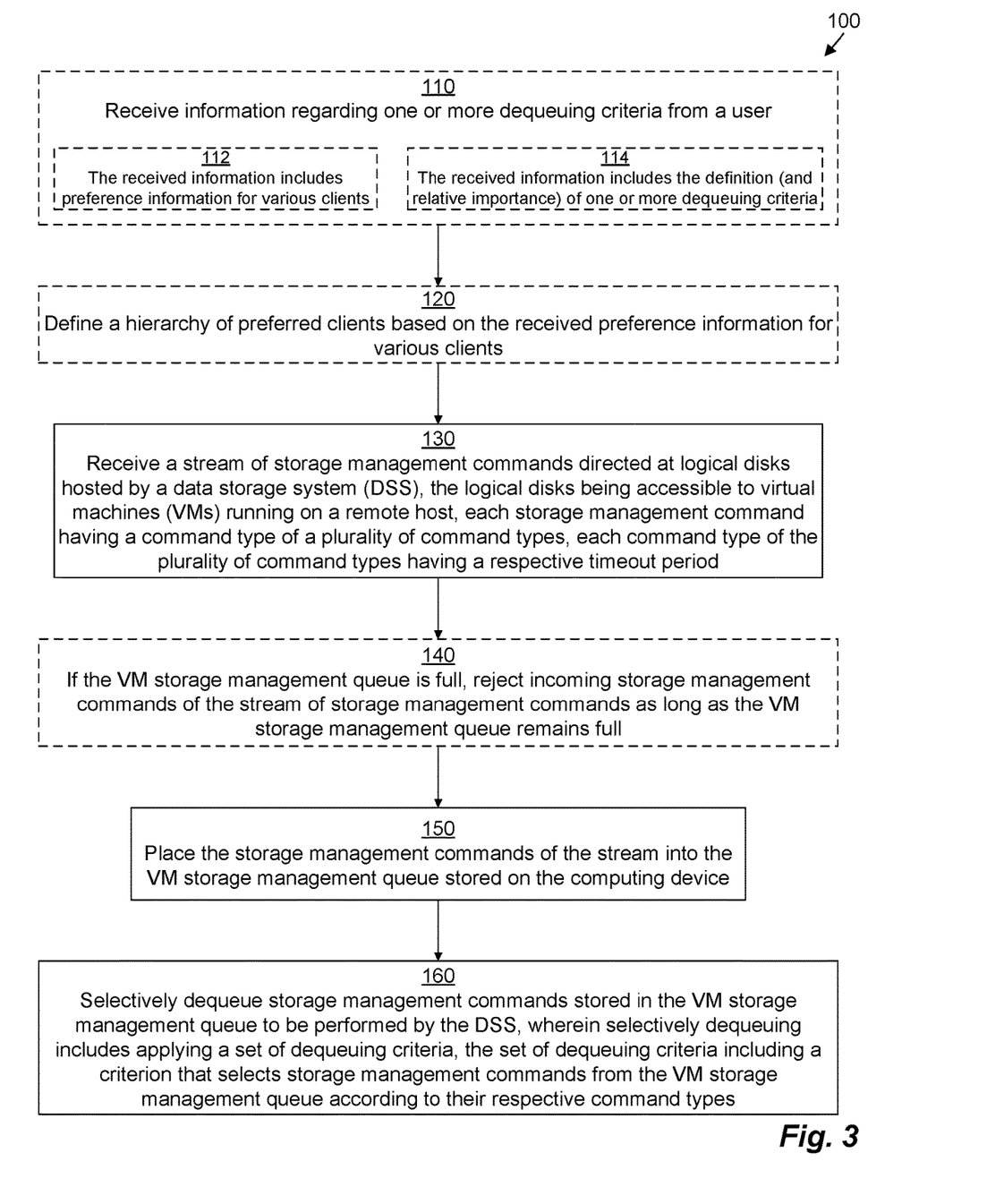
FIG. 3 is a flowchart depicting an example method for use in conjunction with various embodiments.

FIG. 3 illustrates an example method 100 performed by computing device 69. It should be understood that any time a piece of software (e.g., storage management module 60, operation scheduler 62, VVol manager 64, Command-type Aware VVol Management Command Scheduler 66, etc.) is described as performing a method, process, step, or function, in actuality what is meant is that a computing device (e.g., host 32, DSS 44, VVol Manager Server 63, etc.) on which that piece of software is running performs the method, process, step, or function when executing that piece of software on its processing circuitry 72.

Figure 4:
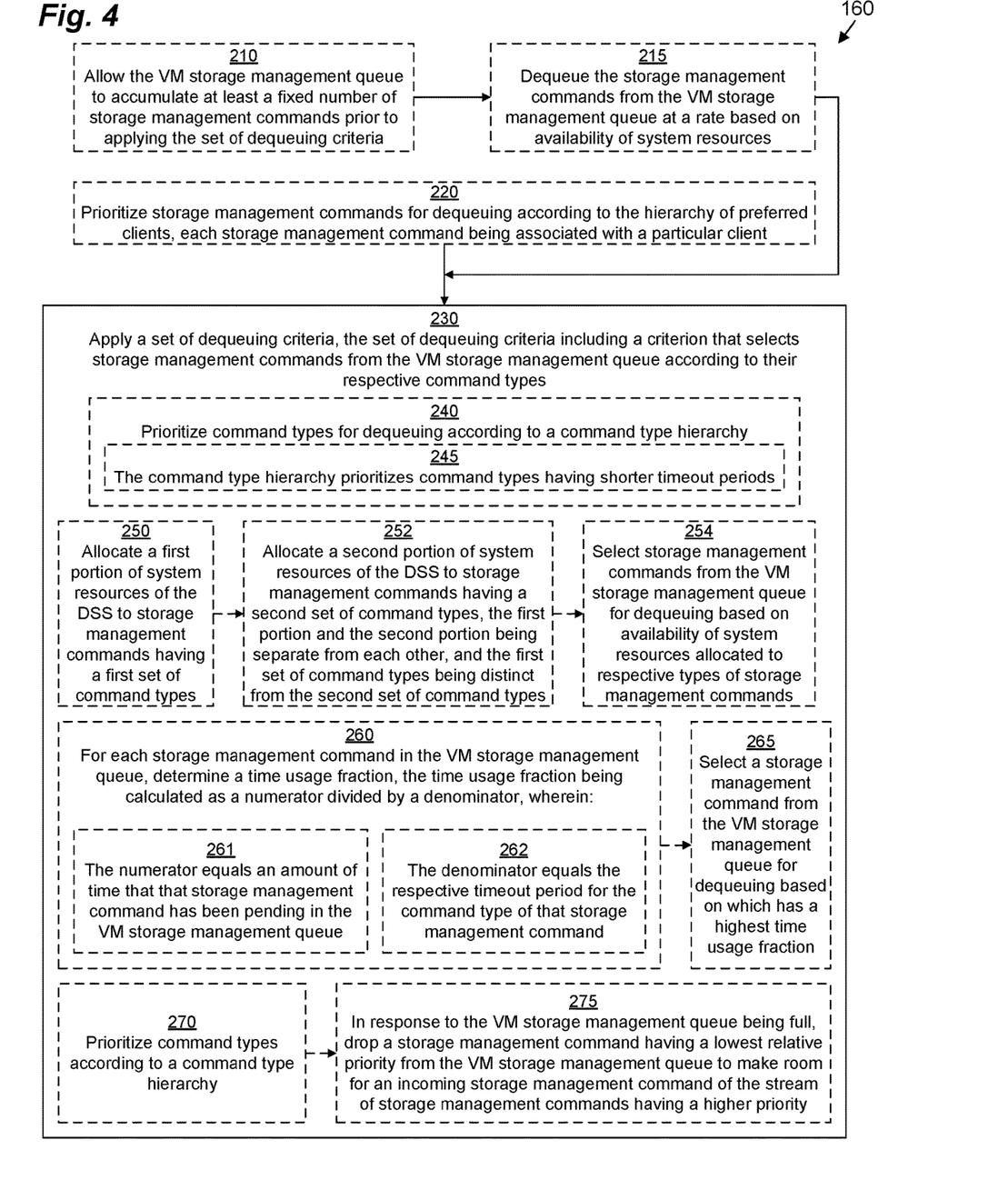
FIG. 4 is a flowchart depicting an example method for use in conjunction with various embodiments.

It should be understood that, within FIGS. 3 and 4, various steps and sub-steps are dashed because they may be optional and not fundamental to method 100. However, it should be understood that, in some embodiments, one or more of the other steps or sub-steps may also be omitted. Similarly, in some embodiments, one or more steps or sub-steps may be combined together or performed in a different order. Method 100 is performed by computing device 69, more specifically by its processing circuitry in conjunction with various other system components.

In optional step 110, Command-type Aware VVol Management Command Scheduler 66 receives information regarding one or more dequeueing criteria 84 from a user via the UI circuitry 76 or via the network interface circuitry (e.g., from a remote computer running a remote control interface and having its own UI circuitry for interfacing with the user). Step 110 may either involve sub-step 112 or sub-step 114.

In sub-step 112, Command-type Aware VVol Management Command Scheduler 66 receives information regarding preference information for various clients. For example, a storage vendor may sell VM storage to multiple clients. The storage vendor may charge different rates to different clients in a tiered manner. Thus, an administrator of the storage vendor may input information in step 112 that indicates that storage commands 68 from client A, who has paid for premium service, should take priority over storage commands 68 from client B, who has only paid for standard service.

In sub-step 114, Command-type Aware VVol Management Command Scheduler 66 receives information regarding the definition or definitions of one or more dequeueing criteria 84. The information may also include the relative importance of the various dequeueing criteria 84 so that the dequeueing criteria 84 can be applied in a particular user-defined order.

In optional step 120, which is performed in embodiments in which sub-step 112 was performed, Command-type Aware VVol Management Command Scheduler 66 defines a hierarchy of preferred clients based on the received preference information from sub-step 112. Thus, if the user inputs that client A has preference over client B, client B has preference over client C, and client D has equal preference to client B, Command-type Aware VVol Management Command Scheduler 66 creates (or modifies) a particular dequeueing criterion 84(x) associated with client prioritization to indicate a hierarchy of A>(B, D)>E.

In step 130, Command-type Aware VVol Management Command Scheduler 66 receives a stream 67 of storage management commands 68 directed at logical disks (e.g., mounted volumes 50) hosted by DSS 44, the logical disks being accessible to VMs 34 running on a remote host 32, each storage management command 68 having a command type of a plurality of command types, each command type of the plurality of command types having a respective timeout period. For example, in one embodiment, the command types in Table 1 have respective associated timeout periods as indicated. Step 130 may be thought of as operating continuously on a continually-updated stream 67 of storage management commands 68.

TABLE 1

| Command Type | What it does | Timeout period |
| --- | --- | --- |
| Create | Creates a new VVol in a specified storage container with specified attributes | None (0) |
| Delete | Deletes a VVol | None (0) |
| Bind | Binds a previously-created VVol to a specified Protocol Endpoint | 60 seconds |
| Unbind | Unbinds a previously-bound VVol from its Protocol Endpoint | 60 seconds |
| Snapshot Commit | Creates a snapshot of a specified VVol | 5 seconds |

In some embodiments, in optional step 140, if the VVol Management Command Queue 65 is full (e.g., if it contains more than a pre-defined maximum number of queued VVol management commands 80), Command-type Aware VVol Management Command Scheduler 66 rejects incoming storage management commands 68 of the stream 67 as long as the VVol Management Command Queue 65 remains full. In some embodiments, Command-type Aware VVol Management Command Scheduler 66 rejects incoming storage management commands 68 regardless of the type or source of the incoming storage management commands 68.

In step 150, Command-type Aware VVol Management Command Scheduler 66 places the incoming storage management commands 68 into the VVol Management Command Queue 65.

Finally, in step 160, Command-type Aware VVol Management Command Scheduler 66 selectively dequeues queued storage management commands 80 stored in the VVol Management Command Queue 65 to be performed by the DSS 44. Selectively dequeueing includes the Command-type Aware VVol Management Command Scheduler 66 applying a set of dequeueing criteria 84, the set of dequeueing criteria 84 including at least one criterion 86 that selects queued storage management commands 80 from the VVol Management Command Queue 65 according to their respective command types. Further detail with respect to step 160 is provided below in connection with FIG. 4.

In response to dequeueing, VVol Manager 64 sends the dequeued commands to the operation scheduler 62 of the storage management module 60 of the DSS. If the VVol Manager 64 operates within memory 48 of DSS 44, this may be done by marking the dequeued commands as ready for operation scheduling or by a memory transfer. If the VVol Manager 64 operates on VVol Manager server 63 or a host 32 off the DSS 44, this may be done by sending the dequeued commands over SAN 42.

FIG. 4 depicts step 160 in further detail.

In optional step 210, Command-type Aware VVol Management Command Scheduler 66 allows the VVol Management Command Queue 65 to accumulate at least a fixed number (e.g., threshold minimum number 82) of queued VVol management commands 80 prior to applying the set of dequeueing criteria 84. In another embodiment (not depicted), instead of waiting for the VVol Management Command Queue 65 to accumulate the threshold minimum number 82 of queued VVol management commands 80, Command-type Aware VVol Management Command Scheduler 66 waits until the oldest queued VVol management command 80 in the VVol Management Command Queue 65 has been pending in the queue 65 for at least a predetermined time threshold (e.g., 1 second as measured by clock 78) prior to applying the set of dequeueing criteria 84. Optional step 210 may be viewed as embodying a particular dequeueing criterion 84 that is not command-type aware.

In optional step 215, Command-type Aware VVol Management Command Scheduler 66 dequeues the queued VVol management commands 80 from the VVol Management Command Queue 65 at a rate based on availability of system resources 54. Thus, for example, in one embodiment, if there are q cores 56, Command-type Aware VVol Management Command Scheduler 66 dequeues queued VVol management commands 80 from the VVol Management Command Queue 65 such that no more than q (or, in some embodiments, q−1, 2q, or 2q−1) such commands are pending in the operation scheduler 62 at once. As another example, in another embodiment, if DSS 44 is capable of executing at most r threads 58 simultaneously (or capable of executing r threads 58 in parallel efficiently), Command-type Aware VVol Management Command Scheduler 66 dequeues queued VVol management commands 80 from the VVol Management Command Queue 65 such that no more than r (or, in some embodiments, r−1) such commands are pending in the operation scheduler 62 at once. Optional step 215 may be viewed as embodying a particular dequeueing criterion 84 that is not command-type aware.

In optional step 220, Command-type Aware VVol Management Command Scheduler 66 prioritizes the queued VVol management commands 80 for dequeueing from the VVol Management Command Queue 65 according to a hierarchy of preferred clients, each queued VVol management command 80 being associated with a particular client. In some embodiments, the hierarchy of preferred clients is pre-defined, while in other embodiments, the hierarchy of preferred clients was previously generated in step 120.

In step 230, Command-type Aware VVol Management Command Scheduler 66 applies dequeueing criteria 84 including one or more criteria 86 that select queued VVol management commands 80 from the VVol Management Command Queue 65 according to their respective command types. Step 230 may be accomplished by applying the one or more dequeueing criteria 84 including one or more special criteria 86. Several dequeueing criteria 84 may be applied using a pre-defined or user-defined (see sub-step 114 above) relative importance ranking of the various dequeueing criteria 84. In some embodiments, this may take the form of first applying a most-important dequeueing criterion 84, then, to break any ties, applying a second-most-important dequeueing criterion 84, then, to break any ties, applying a third dequeueing criterion 84, etc. In other embodiments, it may take the form of assigning relative weights to the different dequeueing criteria 84 and applying each of the dequeueing criteria 84 to generate scores for the queued VVol management commands 80 from the VVol Management Command Queue 65, weighting the generated scores from each of the dequeueing criteria 84 by their respective weights to achieve a final score, which may be used to rank the queued VVol management commands 80 for dequeueing from the VVol Management Command Queue 65.

Various sub-steps and sequences of sub-steps within step 230 may each define separate dequeueing criteria 84. Thus, various dequeueing criteria 84 are defined by sub-step 240; sub-steps 250, 252, and 254; sub-steps 260 and 265; and sub-steps 270 and 275.

In sub-step 240, Command-type Aware VVol Management Command Scheduler 66 prioritizes command types for dequeueing according to a command type hierarchy. Thus, for example, Snapshot commands may take priority over Bind and Unbind commands, which take priority over Create and Delete commands.

In one embodiment, depicted in sub-sub-step 245, the command type hierarchy prioritizes command types having shorter timeout periods as opposed to those having longer timeout periods. Thus, since Create and Delete commands have no timeout periods, they are assigned a lowest priority in the command type hierarchy, while Bind and Unbind commands, which have timeout periods of 60 seconds, are assigned an intermediate priority in the command type hierarchy. Snapshot commands, which have timeout periods of 5 seconds, are assigned a higher priority in the command type hierarchy.

In sub-step 250, Command-type Aware VVol Management Command Scheduler 66 allocates a first portion of system resources 54 of the DSS 44 to storage management commands 68 having a first set of command types. For example, in one embodiment, if DSS 44 is able to execute r threads 58 in parallel (or, similarly, if DSS 44 has q cores 56), then Command-type Aware VVol Management Command Scheduler 66 may allocate M threads 58 (or cores 56) to storage management commands 68 of the Snapshot command type, where M<r (M<q).

In sub-step 252, Command-type Aware VVol Management Command Scheduler 66 allocates a second portion of system resources 54 to storage management commands 68 having a second set of command types. For example, in one embodiment, if DSS 44 is able to execute r threads 58 in parallel (or, similarly, if DSS 44 has q cores 56), then Command-type Aware VVol Management Command Scheduler 66 may allocate N threads 58 (or cores 56) to storage management commands 68 of the Bind, Unbind, Create, and Delete command types, where N<r (N<q). In one embodiment, M+N=r or r−1 (or M+N=q or q−1). In other embodiments, additional portions of system resources 54 are also allocated to other storage management commands 68 having other command types. Thus, for example, M thread are allocated to Snapshot commands, N threads are allocated to Bind and Unbind commands, and P threads are allocated to Create and Delete commands, where M+N+P=r.

In sub-step 254, Command-type Aware VVol Management Command Scheduler 66 selects queued VVol management commands 80 from the VVol Management Command Queue 65 for dequeueing based on availability of system resources 54 allocated to respective types of storage management commands 68. Thus, for example, if DSS 44 has thirty-two cores 56, Command-type Aware VVol Management Command Scheduler 66 may allocate five cores 56 to Snapshot commands, fifteen cores 56 to Bind and Unbind commands, and eleven cores 56 to Create and Delete commands. This helps ensure that even though Snapshot commands have short timeout periods, the DSS 44 being inundated with a large number of earlier commands with longer timeout periods will not block the short-timeout Snapshot commands from being executed prior to timing out.

In sub-step 260, for each queued VVol management command 80 from the VVol Management Command Queue 65, Command-type Aware VVol Management Command Scheduler 66 determines a time usage fraction, the time usage fraction being calculated as a numerator divided by a denominator. The numerator may be defined as in sub-sub-step 261, and the denominator numerator may be defined as in sub-sub-step 262.

In sub-sub-step 261, Command-type Aware VVol Management Command Scheduler 66 determines the numerator as being equal to an amount of time (e.g., as measured by clock 78) that that queued VVol management command 80 has been pending in the VVol Management Command Queue 65. In sub-sub-step 262, Command-type Aware VVol Management Command Scheduler 66 determines the denominator as being equal to the respective timeout period for the command type of that queued VVol management command 80. Thus, for example, if a Snapshot command has been pending in the VVol Management Command Queue 65 for 3 seconds, it would have a time usage fraction of ⅗. As another example, if a Bind command has been pending in the VVol Management Command Queue 65 for 27 seconds, it would have a time usage fraction of 27/60. As another example, since a Create command has no timeout period, no matter how long a Create command has been pending, it would have a time usage fraction of 0.

In sub-step 265, Command-type Aware VVol Management Command Scheduler 66 selects queued VVol management commands 80 from the VVol Management Command Queue 65 for dequeueing based on which has a highest time usage fraction. Thus, the Snapshot command with the time usage fraction of ⅗ from the above example would be dequeued prior to the Bind command with the time usage fraction of 27/60, which would itself be dequeued prior to the Snapshot command with the time usage fraction of 0.

In sub-step 270, Command-type Aware VVol Management Command Scheduler 66 prioritizes command types according to a command type hierarchy. This may either be the same command type hierarchy from sub-step 240 or it may be a different one.

In sub-step 275, in response to the VVol Management Command Queue 65 being full (or in response to an attempt to add a new storage management command 68 to an already-full VVol Management Command Queue 65), Command-type Aware VVol Management Command Scheduler 66 drops a queued VVol management command 80 having a lowest relative priority (in the hierarchy of sub-step 270) from the VVol Management Command Queue 65 to make room for an incoming storage management command 68 of the stream 67 having a higher priority. In such a case, the VVol Manager would send a failure response (e.g., a VASA PROVIDER BUSY response) to the host 32 that issued the original storage management command 68 that was dropped.

Thus, techniques for implementing a VASA-aware scheduling layer able to present VASA commands 68 to the DSS 44 in a manner that takes the type of VASA command and other protocol-specific requirements into account in the scheduling process have been provided. This is achieved by implementing a Command-type Aware VVol Management Command Scheduler 66 in conjunction with a VVol Management Command Queue 65 on the VASA provider 69.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed.

Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by a computing device, the method comprising:
   receiving, by a virtual logical disk manager running on the computing device, a stream of storage management commands directed at logical disks hosted by a data storage system (DSS), the logical disks being accessible to virtual machines (VMs) running on a remote host, each storage management command having a predefined command type of a predefined plurality of command types, each command type of the plurality of command types having a respective predefined timeout period;
   placing all the storage management commands of the stream into a single VM storage management queue stored on the computing device without regard for their respective command types, the VM storage management queue being maintained by the virtual logical disk manager; and
   selectively dequeueing storage management commands stored in the single VM storage management queue to an operations scheduler running as part of a storage management module of the DSS to be performed by the DSS, wherein selectively dequeueing includes applying a set of dequeueing criteria, the set of dequeueing criteria including a criterion that selects storage management commands from the single VM storage management queue according to their respective command types, the operations scheduler being unaware of the predefined plurality of command types, wherein the operations scheduler is configured to assign storage management commands to particular processing cores of the DSS independently of the virtual logical disk manager and the VM storage management queue.

2. The method of claim 1 wherein applying the set of dequeueing criteria includes applying the criterion that selects storage management commands from the VM storage management queue according to their respective command types by prioritizing command types for dequeueing according to a command type hierarchy.

3. The method of claim 2 wherein the command type hierarchy prioritizes command types having shorter timeout periods.

4. The method of claim 2 wherein selectively dequeueing further includes allowing the VM storage management queue to accumulate at least a fixed number of storage management commands prior to applying the criterion that selects storage management commands from the VM storage management queue according to their respective command types by prioritizing command types according to the command type hierarchy.

5. The method of claim 2 wherein:
the predefined plurality of command types includes a snapshot command type configured to initiate creation of a snapshot of an existing logical disk and a create command type configured to initiate creation of a new logical disk; and
the command type hierarchy prioritizes dequeueing of commands of the snapshot command type over dequeueing of commands of the create command type.

6. The method of claim 1 wherein applying the set of dequeueing criteria includes applying the criterion that selects storage management commands from the VM storage management queue according to their respective command types by:
allocating a first portion of system resources of the DSS to storage management commands having a first set of command types;
allocating a second portion of system resources of the DSS to storage management commands having a second set of command types, the first portion and the second portion being separate from each other, and the first set of command types being distinct from the second set of command types; and
selecting storage management commands from the VM storage management queue for dequeueing based on availability of system resources allocated to respective types of storage management commands.

7. The method of claim 6 wherein:
the first portion of system resources includes a first subset of a set of processing threads the DSS is capable of executing in parallel; and
the second portion of system resources includes a second subset of the set of processing threads the DSS is capable of executing in parallel, the first subset and the second subset being mutually exclusive.

8. The method of claim 6 wherein:
the first portion of system resources includes a first subset of a set of processing cores of the DSS; and
the second portion of system resources includes a second subset of the set of processing cores of the DSS, the first subset and the second subset being mutually exclusive.

9. The method of claim 1 wherein applying the set of dequeueing criteria includes applying the criterion that selects storage management commands from the VM storage management queue according to their respective command types by:
for each storage management command in the VM storage management queue, determining a time usage fraction, the time usage fraction being calculated as a numerator divided by a denominator, wherein:
the numerator equals an amount of time that that storage management command has been pending in the VM storage management queue; and
the denominator equals the respective timeout period for the command type of that storage management command; and
selecting a storage management command from the VM storage management queue for dequeueing based on which has a highest time usage fraction.

10. The method of claim 1 wherein applying the set of dequeueing criteria includes applying the criterion that selects storage management commands from the VM storage management queue according to their respective command types by:
prioritizing command types according to a command type hierarchy; and
in response to the VM storage management queue being full, dropping a storage management command having a lowest relative priority from the VM storage management queue to make room for an incoming storage management command of the stream of storage management commands having a higher priority.

11. The method of claim 1 wherein selectively dequeueing includes:
allowing the VM storage management queue to accumulate at least a fixed number of storage management commands prior to applying the set of dequeueing criteria; and
dequeueing the storage management commands from the VM storage management queue at a rate based on availability of system resources.

12. The method of claim 1 wherein applying the set of dequeueing criteria includes prioritizing storage management commands for dequeueing according to a hierarchy of preferred clients, each storage management command being associated with a particular client.

13. The method of claim 12 wherein the method further comprises:
receiving preference information for various clients from a user via a user interface device; and
defining the hierarchy of preferred clients based on the received preference information for various clients.

14. The method of claim 1 wherein the method further comprises receiving a portion of the set of dequeueing criteria from a user via a user interface device.

15. The method of claim 1 wherein the method further comprises, in response to the VM storage management queue being full, rejecting incoming storage management commands of the stream of storage management commands as long as the VM storage management queue remains full.

16. The method of claim 1 wherein:
the DSS is the computing device; and
selectively dequeueing storage management commands includes sending the dequeued storage management commands from the VM storage management queue to a storage operation scheduler of the DSS.

17. The method of claim 1 wherein:
the DSS is external to the computing device; and
selectively dequeueing storage management commands includes sending the dequeued storage management commands from the computing device to the DSS over a network connection.

18. A computer program product comprising a non-transitory computer-readable storage medium storing a set of instructions, which, when executed by a computing device, cause the computing device to:
receive, by a virtual logical disk manager running on the computing device, a stream of storage management commands directed at logical disks hosted by a data storage system (DSS), the logical disks being accessible to virtual machines (VMs) running on a remote host, each storage management command having a predefined command type of a predefined plurality of command types, each command type of the plurality of command types having a respective predefined timeout period;
place all the storage management commands of the stream into a single VM storage management queue stored on the computing device without regard for their respective command types, the VM storage management queue being maintained by the virtual logical disk manager; and selectively dequeue storage management commands stored in the single VM storage management queue to an operations scheduler running as part of a storage management module of the DSS to be performed by the DSS, wherein selectively dequeuing includes applying a set of dequeuing criteria, the set of dequeuing criteria including a criterion that selects storage management commands from the single VM storage management queue according to their respective command types, the operations scheduler being unaware of the predefined plurality of command types, wherein the operations scheduler is configured to assign storage management commands to particular processing cores of the DSS independently of the virtual logical disk manager and the VM storage management queue.

19. An apparatus comprising:

network interface circuitry connecting to a remote host; and processing circuitry coupled to memory, the processing circuitry being configured to:

receive, via the network interface circuitry, by a virtual logical disk manager running on the processing circuitry, a stream of storage management commands directed at logical disks hosted by a data storage system (DSS), the logical disks being accessible to virtual machines (VMs) running on the remote host, each storage management command having a predefined command type of a predefined plurality of command types, each command type of the plurality of command types having a respective predefined timeout period;

place all the storage management commands of the stream into a single VM storage management queue stored on the apparatus without regard for their respective command types, the VM storage management queue being maintained by the virtual logical disk manager; and selectively dequeue storage management commands stored in the single VM storage management queue to an operations scheduler running as part of a storage management module of the DSS to be performed by the DSS, wherein selectively dequeuing includes applying a set of dequeuing criteria, the set of dequeuing criteria including a criterion that selects storage management commands from the single VM storage management queue according to their respective command types, the operations scheduler being unaware of the predefined plurality of command types, wherein the operations scheduler is configured to assign storage management commands to particular processing cores of the DSS independently of the virtual logical disk manager and the VM storage management queue.

* * * * *